United States Patent Office 3,321,703
Patented May 23, 1967

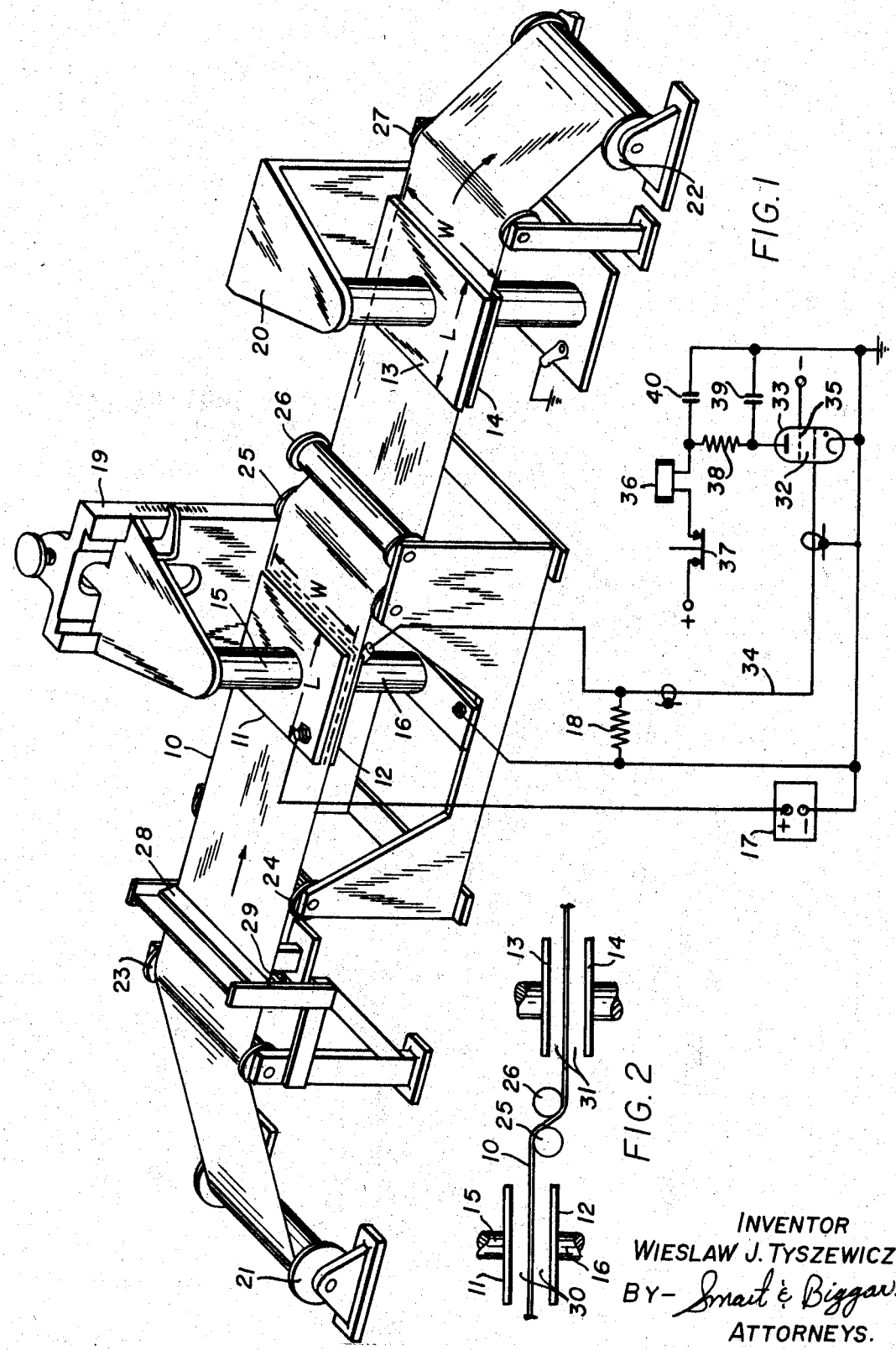

3,321,703
METHOD AND APPARATUS FOR TESTING A DI-ELECTRIC MATERIAL IN THE PRESENCE OF A GAS BY MOVING THE MATERIAL WITH A SUFFICIENT VELOCITY TO IONIZE THE GAS
Wieslaw Jozef Tyszewicz, Dollard des Ormeaux, Quebec, Canada, assignor to Northern Electric Company Limited, Montreal, Quebec, Canada
Filed Dec. 9, 1963, Ser. No. 328,955
27 Claims. (Cl. 324—54)

This invention relates to a method and apparatus for making electrical contact with a dielectric material, which may be used for testing the dielectric strength of the material.

In the past various methods and apparatuses have been used for making electrical contact with a dielectric or insulating sheet material when subjecting such material to a high voltage dielectric test. The insulating material, usually in the form of a tape, is advanced between a pair of metallic electrodes which make mechanical contact with opposite surfaces of the tape. The electrodes are generally in the form of brushes, chains, rollers or wipers. As the tape is advanced, a predetermined test voltage is applied between the electrodes. The test voltage is of sufficient amplitude that when a flaw or hole in the tape passes between the electrodes arcing occurs across the gap, thereby resulting in a surge of current which can be readily detected by suitable means. The advancing tape can then be stopped and inspected, spliced or repaired.

As the tape is passed between the electrodes small particles of dirt which accumulate on the surfaces of the tape are pressed into it by the mechanical pressure of the electrodes in contact with the tape. With very thin tape (3 mils or less) this seriously damages the tape. In addition a breakdown of the dielectric material while in contact with the electrodes establishes a rapid current flow which pits the electrodes and thus causes further damage to the remaining portion of the thin tape.

An improvement in the prior art has been developed to overcome the disadvantages of making mechanical contact with the tape. This involves slowly passing the tape between a pair of electrodes so that the tape is spaced from at least one of the electrodes. When a void or gap in the material passes between the electrodes, the applied voltage is of sufficient amplitude to arc across the gap thereby resulting in a large current flow that is detected by suitable means. However, the test voltage which is applied between the electrodes divides between the tape and the air gap depending upon the relative resistance of each. With varying conditions, the voltage drop across the air gap (and consequently the voltage drop across the tape) varies resulting in an uncontrollable test voltage.

The above disadvantages have been overcome by the present invention which advances the tape between a pair of electrodes so that the electrodes do not touch the surfaces of the tape being tested. Unlike the previous methods, the tape is advanced with sufficient velocity between the electrodes so that the voltage applied between the electrodes will continuously ionize the air gap between the surfaces of the tape and the electrodes. The ionization of the air provides a low resistance path for the current charging the dielectric tape thereby resulting in substantially the full test voltage being applied across the tape. Since no mechanical contact is made between the electrodes and the surfaces of the tape, deterioration of these tapes due to this contact is avoided.

An example embodiment of the invention will now be described with reference to the accompanying drawings in which:

FIGURE 1 is a perspective view of the mechanical apparatus and includes a schematic diagram of the accompanying electrical circuit; and FIGURE 2 is an elevated side view of that portion of the apparatus shown in FIGURE 1 which provides the air gaps.

Referring now to the drawings, a dielectric sheet material in the form of a tape 10 is continuously advanced between a first pair of opposed parallel plates 11 and 12 and a second pair of opposed parallel plates 13 and 14. The first pair of plates 11 and 12 are mounted on a pair of high voltage insulators 15 and 16, so that a predetermined test voltage from a D.-C. source of power 17 can be applied between the plates 11 and 12 through a serially connected resistor 18. A stand 19 supports the high voltage insulators 15 and 16. The second pair of parallel plates 13 and 14 are electrically short circuited together and grounded through supporting stand 20.

The tape 10 is fed from a give-up reel 21 to a motorised take-up reel 22. The tape is prevented from sagging by rollers 23 and 24 interposed between the give-up reel 21 and the first pair of plates 11 and 12, rollers 25 and 26 interposed between the two pairs of parallel plates 11, 12 and 13, 14 and a roller 27 interposed between the second pair of parallel plates 13 and 14 and the take-up reel 22. In addition, the tape is under constant tension provided by the use of an electro-mechanical brake (not shown) attached to the give-up reel. Occurrence of any sag in the tape could result in mechanical damage to the tape, particularly when the tape is being transported at high linear speeds. If the sag were to occur as the tape passed betwen the second pair of plates 13 and 14, the surface of the tape 10 rubbing against either of the plates 13 and 14 would have a tendency to electrostatically charge up the tape 10. This in turn could cause discharge sparks on the take-up reel 22, which would damage the tape 10.

Before the tape 10 is advanced between the first pair of plates 11 and 12, it passes between a pair of felt cleaners 28 and 29 that are interposed between the rollers 23 and 24. Both pairs of parallel plates 11, 12 and 13, 14 are spaced from the adjacent surfaces of the tape 10 by small air gaps 30 and 31 respectively. The width of the gaps 30 and 31 is not critical and in the present embodiment is adjusted to approximately 0.005 inch when testing a tape of the same thickness.

The voltage from the D.-C. source of power 17 which is applied between the first pair of plates 11 and 12 is adjusted to the voltage specified for the test. When the stationary tape 10 is placed between the parallel plates 11 and 12 charged to this specified voltage, the potential gradient of the air in the gaps 30 is increased by an amount depending upon the dielectric constant and the thickness of the tape 10. Consequently, if the width between the parallel plates 11 and 12 is chosen so that the air between them breaks down when the specified voltage is applied and no tape is present, then when the tape 10 is placed between the plates 11 and 12, the air in the gaps 30 will easily ionize and the voltage applied across the plates 11 and 12 will appear across the surfaces of the tape 10. However, since the tape 10 is stationary, the surfaces of the tape 10 soon become charged and the air layer in the gaps 30 then de-ionizes. The accumulated charge slowly leaks off into the surrounding air and into other sections of the tape 10 and pockets of charges of various potentials are formed along the surfaces of the tape 10. A non-uniform voltage drop is then again established across the air gaps 30 but is not large enough to ionize the air in the gaps 30. The voltage, therefore, which appears across the tape 10 is smaller than that which is applied between the pair of plates 11 and 12. If, however, the tape 10 is advanced rapidly between the plates 11 and 12, there will be a steady ionization of the air in the gaps 30, and a steady charging current will flow into the tape 10. This charging current maintains ionization of the air gaps 30 and is evidenced by a blue glow appearing in the front section of the plates 11 and 12 and by the characteristc smell of ozone. Under such conditions, the voltage drop across the air gaps 30 is negligible and, therefore, substantially the full voltage from the D.-C. source of power 17 is applied across the surfaces of the tape 10. The intensity of the ionization and the quantity of changing current for a given width of the air gaps 30 and a given dielectric constant of the tape 10 depends upon the linear speed of the advancing tape 10, provided that the voltage between the pair of parallel plates 11 and 12 is maintained constant.

The tape 10 is discharged as it passed between the second pair of parallel plates 13 and 14. The voltage between the surfaces of the tape 10 is sufficient to cause ionization of the air in the gaps 31. To insure good discharge of the tape 10 the second pair of plates 13 and 14 should be as close to the moving tape 10 as practical.

The widths of the air gaps 30 and 31 are therefore, governed by the test voltage used, the linear speed of the advancing tape 10, the humidity of the ambient air, the mechanical tolerances of the guidance system, and other conditions affecting the breakdown point of the air.

In the instances when there are difficulties in ionizing the air gaps because of small test voltages involved, the precharging of one or of both sides of the tape 10 to a voltage of opposite polarity with respect to the voltage from the D.-C. source of power 17 may be advantageous. This would increase the potential difference across the air gaps and thus facilitate easier ionization.

The width W of the first pair of plates 11 and 12 is less than the corresponding width of the tape 10, so as to provide some overlap on each side of the plates 11 and 12. In other words, the plates 11 and 12 do not extend transversely beyond the edges of the tape 10. This prevents arcing over at the edges of the tape 10. The amount of overlap is determined by the test voltage applied by the D.-C. source of power 17 between the plates 11 and 12. The width W of the second pair of plates 13 and 14 is greater than the corresponding width of the tape 10 so that the plates 13 and 14 extend transversely beyond the edges of the tape 10 thereby to insure good discharge of the tape 10. The length L of the first set of plates 11 and 12 is determined by the desired duration of application of the test voltage. The second set of plates 13 and 14 have a length L that is sufficiently long to adequately insure proper discharge of the tape 10. The velocity of the advancing tape 10 is not critical but must be sufficient to maintain ionization of the small air gaps 30 and 31 between the plates 11, 12 and 13, 14 and the tape 10. In the present embodiment, with a test voltage of 10,000 volts applied between the first pair of plates 11 and 12, and with a length L of 2 inches for the sets of plates 11, 12 and 13, 14, a linear speed in excess of 200 feet per minute was found sufficient to maintain this ionization. However it is intended for use at speeds in excess of 400 feet per minute.

When a fault occurs in the tape 10 there is a corresponding increase in current flow around the circuit consisting of the D.-C. source of power 17, the resistor 18 and the first pair of plates 11 and 12. A positive voltage resulting from current flow through the resistor 18, is coupled to a first control grid 32 of a thyratron 33 by coaxial cable 34. The thyratron 33 is normally prevented from firing by a negative voltage which is applied to a second control grid 35. The positive voltage applied to the first control grid 32 due to the increased current through resistor 18 is sufficient to fire the thyratron 33. This in turn actuates the control contacts (not shown) of a relay 36 which stops the driving mechanism (not shown) of the take-up reel 22. The tape 10 may then be inspected and repaired. The driving mechanism can then be made ready for restarting by depressing a reset button 37 which is connected in series with the relay coil 36 and the thyratron 33. A "pi" filter unit comprising resistor 38 and capacitors 39 and 40 is connected between the thyratron 33 and relay coil 36. This unit bypasses radio frequency energy and also prevents a high voltage build-up across the relay coil 36. If the tape 10 breaks down anywhere in the air gaps 30, the current flow across the gaps 30 will be maintained as long as the defective spot is between the plates 11 and 12.

The linear speed of the advancing tape 10 is maintained relatively constant by the use of a standard control circuit (not shown) utilizing a tachometer which is driven by the advancing tape 10.

The complete assembly is housed in a plastic chamber (not shown) equipped with a motor fan and an exhaust pipe. In this way the operator is protected from both the high voltage and from inhaling ozone which is extracted from the chamber.

What I claim as my invention is:

1. A method of testing dielectric material by making electrical contact with at least one surface of opposite surfaces of the dielectric material in the presence of a gas which comprises advancing said material between a pair of oppositely disposed electrodes so that each of said opposite surfaces is in juxtaposition with one of said electrodes and the dielectric material shields the pair of oppositely disposed electrodes one from the other so as to prevent direct conduction therebetween in the absence of a fault, maintaining said one surface of said material spaced from its adjacent electrode, applying a voltage between said electrodes, advancing said material with sufficient velocity, adjusting the amplitude of the voltage to be sufficient relative to the velocity of the material to ionize the gas between said one surface and said adjacent electrode, and monitoring the current flow to at least one of said electrodes for detecting the occurrence of faults in said material.

2. A method as defined in claim 1 in which the voltage is a D.-C. voltage and is applied between the two electrodes thereby resulting in a continuous charge being applied between the opposite surfaces of the material as it passes between the electrodes and in which the dielectric material is in the form of a sheet and the electrodes each have a width smaller than that of the sheet material and are disposed so that the electrodes do not extend transversely beyond the edges of the sheet material.

3. A method as defined in claim 2 in which the dielectric sheet material is a tape, the surfaces of the material are the broad surfaces of the tape, and the tape is moved longitudinally between the electrodes.

4. A method as defined in claim 3 in which the pair of electrodes comprise two opposed plates disposed parallel to the surfaces of the tape.

5. A method as defined in claim 1 in which the voltage is due to an electrostatic charge which is present between the opposite surfaces of the material.

6. A method as defined in claim 5 in which two additional discharge electrodes are provided and are electrically short-circuited together and grounded thereby removing the charge from the material as it passes between the electrodes.

7. A method as defined in claim 6 in which the dielectric material is a tape, the surfaces of the material are the broad surfaces of the tape, and the tape is moved longitudinally between the electrodes.

8. A method as defined in claim 7 in which the pair of additional discharge electrodes comprise two opposed plates disposed parallel to the surfaces of the tape; the width of the surface of said plates facing the tape being greater than the corresponding width of the surface of the tape, and the plates being disposed so that the plates extend transversely beyond the edges of the tape.

9. A method as defined in claim 2 for testing the dielectric strength between said opposite surfaces of the material which further comprises advancing the material continuously between said pair of oppositely disposed electrodes and then between an additional pair of oppositely disposed electrodes so that each of said opposite surfaces is in juxtaposition with one of the electrodes of said additional pair of electrodes, maintaining said one surface of the material spaced from its adjacent electrodes of said additional pair of electrodes, electrically short-circuiting the additional pair of electrodes together, said material also being advanced with sufficient velocity to ionize the gas between said one surface and said adjacent electrode of the additional pair of electrodes, said continuous charge resulting in a current flowing between said electrodes, and monitoring the current whereby a fault in said material as it passes between said pair of electrodes is detectable by an increase in the current.

10. A method as defined in claim 9 in which the predetermined voltage is of sufficient amplitude to rupture said material when the latter has a thickness less than a predetermined value.

11. A method as defined in claim 10 in which passing said material between the pair of electrodes electrostatically charges said material and passing said material between the additional pair of electrodes electrostatically discharges said material.

12. A method as defined in claim 11 in which the dielectric sheet material is a tape, the surfaces of the material are the broad surfaces of the tape and the tape is moved longitudinally between the pairs of electrodes.

13. A method as defined in claim 12 in which the pair of electrodes comprise a first pair of opposed plates disposed parallel to the surfaces of the tape; the additional pair of electrodes comprise a second pair of opposed plates disposed parallel to the surface of the tape; the width of the surface of said second pair of plates facing said tape being greater than the corresponding width of the surface of the tape, and the second pair of plates being disposed so that the second pair of plates extend transversely beyond the edges of the tape.

14. Apparatus for testing dielectric material by making electrical contact with at least one surface of opposite surfaces of the dielectric material in the presence of a gas comprising a pair of oppositely disposed electrodes, means for applying a voltage between said electrodes, means for advancing said material between said electrodes so that each of said opposite surfaces is in juxtaposition with one of said electrodes, and the dielectric material shields the pair of oppositely disposed electrodes one from the other so as to prevent direct conduction between the electrodes in the absence of a fault, and so that said one surface of said material is spaced from its adjacent electrode, said advancing means serving to advance said material with sufficient velocity and in the presence of a predetermined voltage of sufficient amplitude to ionize the gas between said one surface and said adjacent electrode, and means for monitoring the current flow to at least one of said electrodes for detecting the occurrence of faults in said material.

15. Apparatus as defined in claim 14 in which the voltage is a D.-C. voltage and is applied between the two electrodes thereby resulting in a continuous charge being applied between the opposite surfaces of the material as it passes between the electrodes and in which the dielectric material is in the form of a sheet and the electrodes each have a width smaller than that of the sheet material and are disposed so that the electrodes do not extend transversely beyond the edges of the sheet material.

16. Apparatus as defined in claim 15 in which the dielectric sheet material is a tape, the surfaces of the material are the broad surfaces of the tape, and the tape is moved longitudinally between the electrodes.

17. Apparatus as defined in claim 16 in which the pair of electrodes comprise two opposed parallel plates disposed parallel to the surfaces of the tape.

18. Apparatus as defined in claim 14 in which the voltage is due to an electrostatic charge which is present between the opposite surfaces of the material.

19. Apparatus as defined in claim 18 in which two additional discharge electrodes are provided and are electrically short-circuited together and grounded, thereby removing the charge from the material as it passes between the electrodes.

20. Apparatus as defined in claim 19 in which the dielectric material is a tape, the surfaces of the material are the broad surfaces of the tape, and the tape is moved longitudinally between the electrodes.

21. Apparatus as defined in claim 20 in which the pair of additional discharge electrodes comprise two opposed plates disposed parallel to the surfaces of the tape; the width of the surface of said plates facing the tape being greater than the corresponding width of the surface of the tape, and the plates being disposed so that the plates extend transversely beyond the edges of the tape.

22. Apparatus as defined in claim 15 for testing the dielectric strength between said opposite surfaces of said material which further comprises an additional pair of oppositely disposed electrodes which are electrically short-circuited together and grounded, means for passing said material continuously between said pair and then said additional pair of oppositely disposed electrodes so that each of said opposite surfaces is in juxtaposition with one of said electrodes of said additional pair of electrodes and so that said one surface of said material is disjoined from its adjacent electrode of said additional pair of electrodes, said material also being passed with sufficient velocity to ionize the gas between said one surface and said adjacent electrode of said additional pair of electrodes, said continuous charge being applied between the opposite surfaces of the material resulting in a current flowing through said electrodes and means for monitoring said current to detect a fault in said material as it passes between said pair of electrodes, said fault resulting in a detectable increase in said current.

23. Apparatus as defined in claim 22 in which the predetermined voltage is of sufficient amplitude to rupture said material when the latter has a thickness less than a predetermined value.

24. Apparatus as defined in claim 23 in which said material is electrostatically charged as it passes between said pair of electrodes and is electrostatically discharged as it passes between said additional pair of electrodes.

25. Apparatus as defined in claim 24 in which the dielectric sheet material is a tape, the surfaces of the material are the broad surfaces of the tape and the tape is moved longitudinally between the pairs of electrodes.

26. Apparatus as defined in claim 25 in which the pair of electrodes comprise a first pair of opposed plates disposed parallel to the surfaces of the tape; the additional pair of electrodes comprise a second pair of opposed plates disposed parallel to the surfaces of the tape; the width of the surface of said second pair of plates facing said tape being greater than the corresponding width of the surface of the tape, and the second pair of plates being disposed so that the second pair of plates extend transversely beyond the edges of the tape.

27. Apparatus as defined in claim 26 in which the means for monitoring said current to detect a fault in said material as it passes between said first pair of plates comprises a resistor serially connected between said source of voltage and one plate of said pair of plates and means for monitoring the current flowing through said resistor.

References Cited by the Examiner

UNITED STATES PATENTS

| | | | |
|---|---|---|---|
| 1,824,745 | 9/1931 | Allen. | |
| 1,924,087 | 8/1933 | Allen | 324—61 |
| 2,449,972 | 9/1948 | Beach | 317—2 |
| 2,483,542 | 10/1949 | Hooper | 317—2 |
| 2,782,367 | 2/1957 | Dallas | 324—61 |
| 2,873,425 | 2/1959 | Huggins | 324—54 |
| 2,882,491 | 4/1959 | Gooding | 324—54 |
| 2,900,597 | 8/1959 | Gooding | 324—54 |
| 3,037,149 | 5/1962 | Herbert | 317—2 |
| 3,039,051 | 6/1962 | Locher | 324—61 |
| 3,096,478 | 7/1963 | Brown | 324—54 |
| 3,229,199 | 1/1966 | Mildner | 324—54 |

FOREIGN PATENTS 835,311   3/1952   Germany.

WALTER L. CARLSON, *Primary Examiner*.

G. R. STRECKER, *Assistant Examiner*.